(12) United States Patent
Shih

(10) Patent No.: US 7,599,014 B2
(45) Date of Patent: Oct. 6, 2009

(54) METHOD FOR FABRICATING PIXEL ARRAY SUBSTRATE

(75) Inventor: Ming-Hung Shih, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 687 days.

(21) Appl. No.: 11/444,058

(22) Filed: May 31, 2006

(65) Prior Publication Data
US 2007/0222936 A1   Sep. 27, 2007

(30) Foreign Application Priority Data
Mar. 7, 2006   (TW) ............................. 95107556 A

(51) Int. Cl.
G02F 1/136   (2006.01)
G02F 1/1343  (2006.01)

(52) U.S. Cl. ......................................... 349/43; 349/139

(58) Field of Classification Search .................... 349/38, 349/39, 43, 139; 257/59, 72; 438/30
See application file for complete search history.

(56) References Cited

U.S. PATENT DOCUMENTS

| 6,255,130 B1 * | 7/2001 | Kim .............................. 438/30 |
| 6,287,899 B1 * | 9/2001 | Park et al. .................... 438/149 |
| 6,335,276 B1 * | 1/2002 | Park et al. .................... 438/648 |
| 6,448,117 B1 | 9/2002 | Jen et al. ...................... 438/160 |
| 6,683,660 B1 | 1/2004 | Wu et al. ....................... 349/43 |

FOREIGN PATENT DOCUMENTS

| CN | 1632675 | 6/2005 |
| KR | 1020030082648 | 10/2003 |
| KR | 1020050040334 | 5/2005 |
| KR | 1020060004477 | 1/2006 |

* cited by examiner

Primary Examiner—David Nelms
Assistant Examiner—David Y Chung
(74) Attorney, Agent, or Firm—J.C. Patents

(57) ABSTRACT

A method for fabricating a pixel array substrate is provided. The method includes: forming a plurality of gate electrodes, a plurality of scan lines, a plurality of data line patterns and a plurality of pixel electrode patterns on a substrate; then forming a channel over each of the gate electrodes and a plurality of contact window openings for exposing the data line patterns; then forming a plurality of contact windows electrically connected with the data line patterns; and then forming a plurality of contacting portions which are electrically connected with the contact windows, a plurality of source electrodes which are electrically connected with the data line patterns, and a plurality of drain electrodes which are electrically connected with the pixel electrodes. The data line patterns at each column are electrically connecting with each other via the contacting portions and the contact windows so as to form a data line.

14 Claims, 16 Drawing Sheets

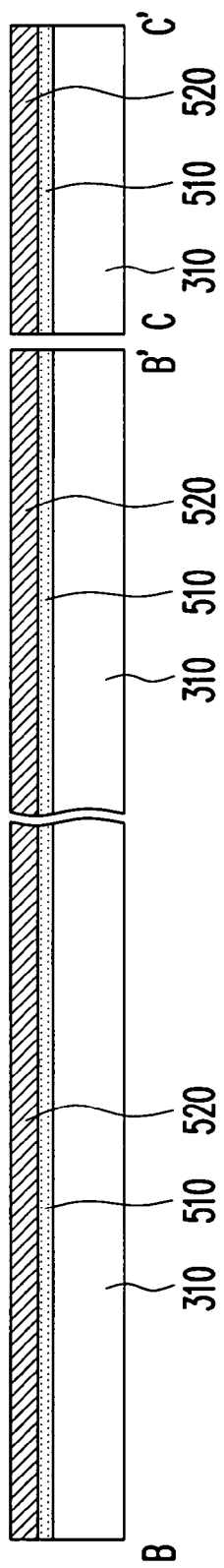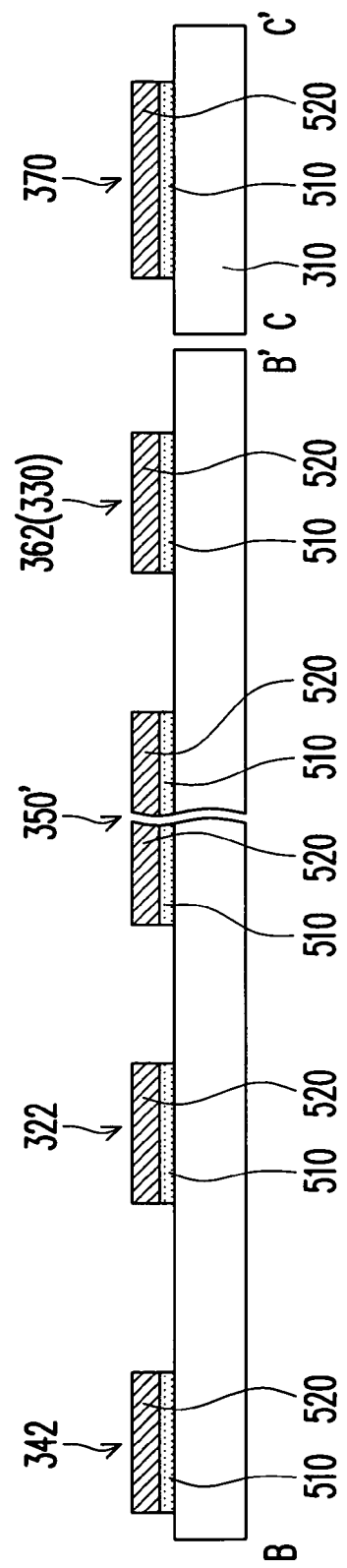

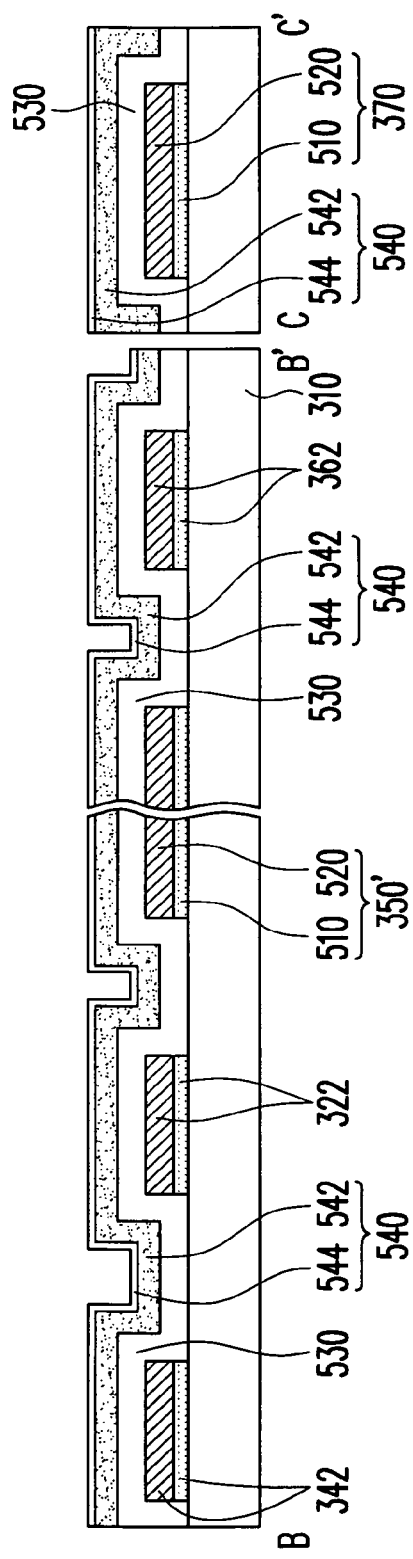
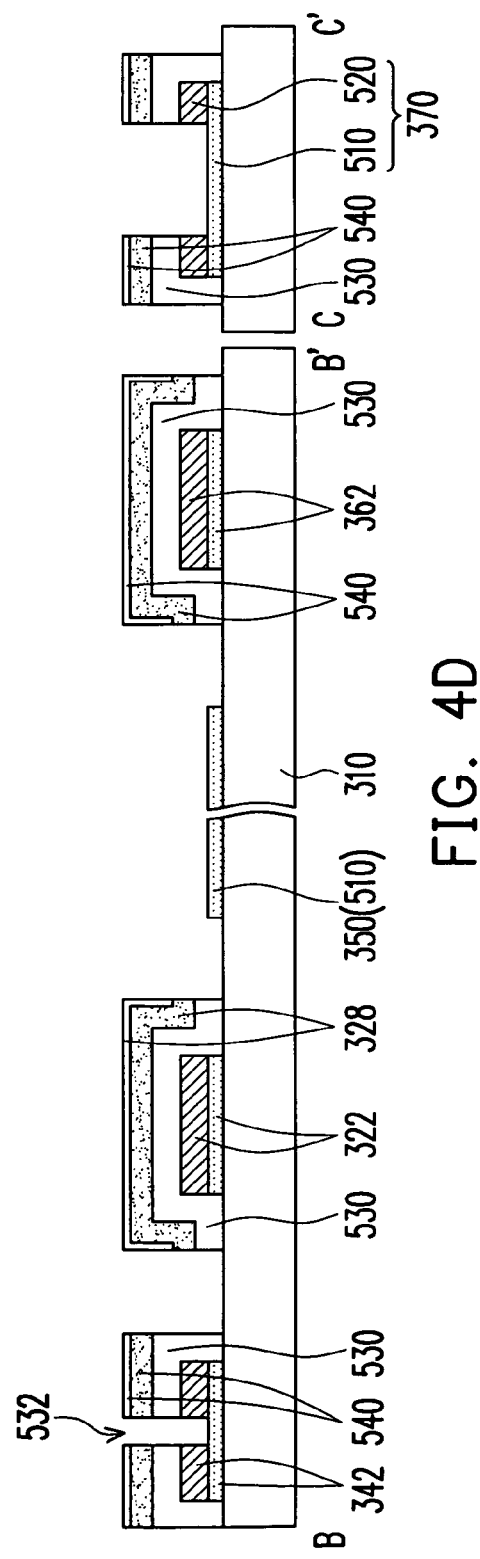
FIG. 4C
FIG. 4D

---

METHOD FOR FABRICATING PIXEL ARRAY SUBSTRATE

CROSS-REFERENCE TO RELATED APPLICATION

This application claims the priority benefit of Taiwan application serial no. 95107556, filed on Mar. 7, 2006. All disclosure of the Taiwan application is incorporated herein by reference.

BACKGROUND OF THE INVENTION

1. Field of the Invention

The present invention relates to a method for fabricating a semiconductor device substrate, and particularly to a method for fabricating an pixel array substrate.

2. Description of Related Art

Along with the development of telecommunication and video technology, many kinds of displays are widely used in cell phones, notebook computers, digital cameras, personal digital assistants (PDAs) or the like. Among such displays, liquid crystal displays (LCDs) and organic light emitting diode (OLED) displays having advantages such as light weight, slimness and low power consumption, have become a mainstream of the display market. Fabricating a pixel array substrate with a semiconductor process is necessary for an LCD or an OLED display. Images can be produced on the display by correspondingly adjusting the colors displayed in different pixels of the pixel array substrate.

FIG. 1 is a top view of a part of a conventional pixel array substrate, while FIGS. 2A to 2E are cross-sectional views (along line A-A' shown in FIG. 1) illustrating a step flow for fabricating a pixel array substrate as shown in FIG. 1. Referring to FIG. 1, a conventional pixel array substrate 100 includes a substrate 110, a plurality of thin film transistors (TFTs) 120, a plurality of scan lines 130, a plurality of data lines 140, and a plurality of pixel electrodes 150. The TFTs 120 are disposed on the substrate 110, and each of the TFTs 120 includes a gate electrode 122, a source electrode 124 and a drain electrode 126, electrically connected to the corresponding scan line 130, data line 140 and pixel electrode 150, respectively. The scan lines 130 and the data lines 140 are generally alternately configured in columns and rows, thus defining a plurality of pixel units (not shown). Specifically, the scan lines 130 are disposed in rows, and the data lines 140 are disposed in columns, while the TFTs 120 are configured near the intersections of the scan lines 130 and the data lines 140.

The TFTs 120 are controlled to be switched on or off in accordance with scanning signals provided by the scan lines 130. When a TFT 120 is turn-on, a corresponding pixel electrode 150 can receive data signals from a corresponding data line 140 via the TFT 120. Thus, the corresponding pixel can adjust the corresponding color to be displayed. However, limited by the conventional process, a thickness of the data lines 140 is usually smaller than a thickness of the scan lines 130, in such a way, a sheet resistance of the data lines 140 is greater than a sheet resistance of the scan lines 130. As such, a delay of data signal transmit will occur, which decreases display quality of the pixel array substrate 100. Particularly, larger pixel array substrates are become more popular; if the pixel array substrate has a larger size, the delay would be even more serious.

The process for fabricating such a pixel array substrate 100 is described below. Referring to FIG. 2A, a first optical mask process is conducted to form a gate electrode 122 on a substrate 110, and scan lines 130, as shown in FIG. 1, are formed at the same time. Then, referring to FIG. 2B, a dielectric layer 160 is formed over the substrate 100 to cover the gate electrode 122, and after that a second optical mask process is conducted to form a channel 128 over the gate electrode 122. Referring to FIG. 2C, a third optical mask process is conducted to form a source electrode 124, a drain electrode 126 and a data line 140; the gate electrode 122, the source electrode 124, the drain electrode 126 and the channel 128 as a whole constitute a TFT 120. Referring to FIG. 2D, a protecting layer 170 is then formed to cover the TFT 120, and thereafter a fourth optical mask process is conducted to define a contact window 172 in the protecting layer 170 for exposing a part of the drain electrode 126. Referring to FIGS. 1 and 2E, a fifth optical mask process is finally conducted to form a pixel electrode 150 on the protecting layer 170, in which a part of the pixel electrode 150 is filled into the contact window 172, so that the pixel electrode 150 is electrically connected to the drain electrode 126. Up to now, a pixel array substrate 100 as shown in FIG. 1 is fabricated.

The cost for making optical masks is one of the considerable expenses for fabricating such a pixel array substrate 100. Unfortunately, according to the above-illustrated process, five different optical masks are required for fabricating such a pixel array substrate 100. Therefore, it is hard to reduce production cost addressing to such a process. Particularly, when a larger pixel array substrate 100 is to be fabricated, larger optical masks are correspondingly required, thus the production cost has to be further increased.

SUMMARY OF THE INVENTION

An objective of the present invention is to provide a pixel array substrate and method for fabricating the same, by which the production cost for fabricating the same can be reduced and the problem of data signal delay can be avoided.

For achieving the foregoing objective and others, the present invention provides a method for fabricating a pixel array substrate. The method includes: first, forming a transparent conductive layer and a first conductive layer in sequence on a substrate, and then conducting a first optical mask process to pattern the first conductive layer and the transparent conductive layer so as to form a plurality of gate electrodes, a plurality of scan lines electrically connected with the gate electrodes, a plurality of data line patterns and a plurality of pixel electrode patterns; then forming a dielectric layer and a semiconductor layer over the substrate in sequence, and then conducting a second optical mask process to pattern the dielectric layer and the semiconductor layer so as to form a channel over each of the gate electrodes and a plurality of contact window openings for exposing the data line patterns, and thereafter removing away the first conductive layer of the pixel electrode patterns so as to form a plurality of pixel electrodes; then forming a second conductive layer over the substrate, the second conductive layer filling into the contact window openings to form a plurality of contact windows electrically connected with the data line patterns, and then conducting a third optical mask process to pattern the second conductive layer to form a plurality of contacting portions which are electrically connected with the contact windows, a plurality of source electrodes which are electrically connected with the data line patterns, and a plurality of drain electrodes which are electrically connected with the pixel electrodes, and thereafter removing the second conductive layer on each of the pixel electrodes. The data line patterns at each column are electrically connecting with each other via the contacting portions and the contact windows so as to form a data line.

For achieving the foregoing objective and others, the present invention also provides a method for fabricating a pixel array substrate, the method includes: first, forming a transparent conductive layer and a first conductive layer in sequence on a substrate, and then conducting a first optical mask process to pattern the first conductive layer and the transparent conductive layer so as to form a plurality of gate electrodes, a plurality of scan line patterns electrically connected with the gate electrodes, a plurality of data lines and a plurality of pixel electrode patterns; then forming a dielectric layer and a semiconductor layer over the substrate in sequence, and then conducting a second optical mask process to pattern the dielectric layer and the semiconductor layer so as to form a channel over each of the gate electrodes and a plurality of contact window openings for exposing the scan line patterns, and thereafter removing the first conductive layer of the pixel electrode patterns to form a plurality of pixel electrodes; then forming a second conductive layer over the substrate, the second conductive layer filling into the contact window openings to form a plurality of contact windows electrically connecting with the scan line patterns; and then conducting a third optical mask process to pattern the second conductive layer to form a plurality of contacting portions which are electrically connected with the contact windows, a plurality of source electrodes which are electrically connected with the data lines, and a plurality of drain electrodes which are electrically connected with the pixel electrodes, and thereafter removing the second conductive layer on each of the pixel electrodes. The scan line patterns at each row are electrically connecting with each other via the contacting portions and the contact windows so as to form a scan line.

According to an embodiment of the invention, the third optical mask process further includes the steps of: forming a protecting layer and a photo-resistant layer in sequence over the substrate; then conducting a backside exposure process by using the gate electrodes, the source electrodes, the drain electrodes, the scan lines and the data lines as a mask and then performing a development process to form a patterned photo-resistant layer; then etching the protecting layer by using the patterned photo-resistant layer as a mask to expose the pixel electrodes; and finally removing the patterned photo-resistant layer.

According to an embodiment of the invention, the first optical mask process further includes forming a plurality of pads, each pad being electrically connected to an end of a corresponding scan line or data line. Furthermore, the second optical mask process further includes remaining a part of the dielectric layer and the semiconductor layer over the pads, and removing a part of the first conducive layer of the pads. Moreover, the third optical mask process further includes removing a part of the second conductive layer over the pads.

According to an embodiment of the invention, the first optical mask process further includes forming a plurality of lower electrodes. Further, the second optical mask process further includes remaining the dielectric layer and the semiconductor layer correspondingly positioned over the lower electrodes. Moreover, the third optical mask process further includes forming a plurality of upper electrodes on the semiconductor layer over a part of the lower electrodes. The lower electrodes and the upper electrodes constitute a plurality of capacitors, in which each lower electrode is electrically connected with a corresponding scan line and each upper electrode is electrically connected with a corresponding pixel electrode.

According to an embodiment of the invention, the third optical mask process further includes removing a part of thickness of the channels.

According to an embodiment of the invention, the semiconductor layer includes a channel material layer and an ohmic contacting material layer.

According to an embodiment of the invention, the first conductive layer has a thickness greater than a thickness of the second conductive layer.

In summary, in accordance with the pixel array substrate and the method for fabricating the same of the present invention, both the data line patterns and the scan lines are derived from the first conductive layer, thus they are made of the same kind material. The data lines are substantially composed of the data line patterns. Therefore, the data lines and the scan lines have approximate sheet resistance, by which the data signal delay can be reduced. Furthermore, comparing with the conventional technology that requires five optical masks, the present invention only employs three optical masks for fabricating the pixel array substrate. Accordingly, the fabricating cost can be reduced.

BRIEF DESCRIPTION OF THE DRAWING

The features of the invention which are believed to be novel are set forth with particularity in the appended claims. The invention, together with its objects and the advantages thereof, may be best understood by reference to the following description taken in conjunction with the accompanying drawings, in which like reference numerals identify like elements in the figures.

FIGS. 4A to 4F are cross-sectional views illustrating a step flow for fabricating a pixel array substrate shown in FIG. 3.

DESCRIPTION OF THE EMBODIMENTS

Figure 1:
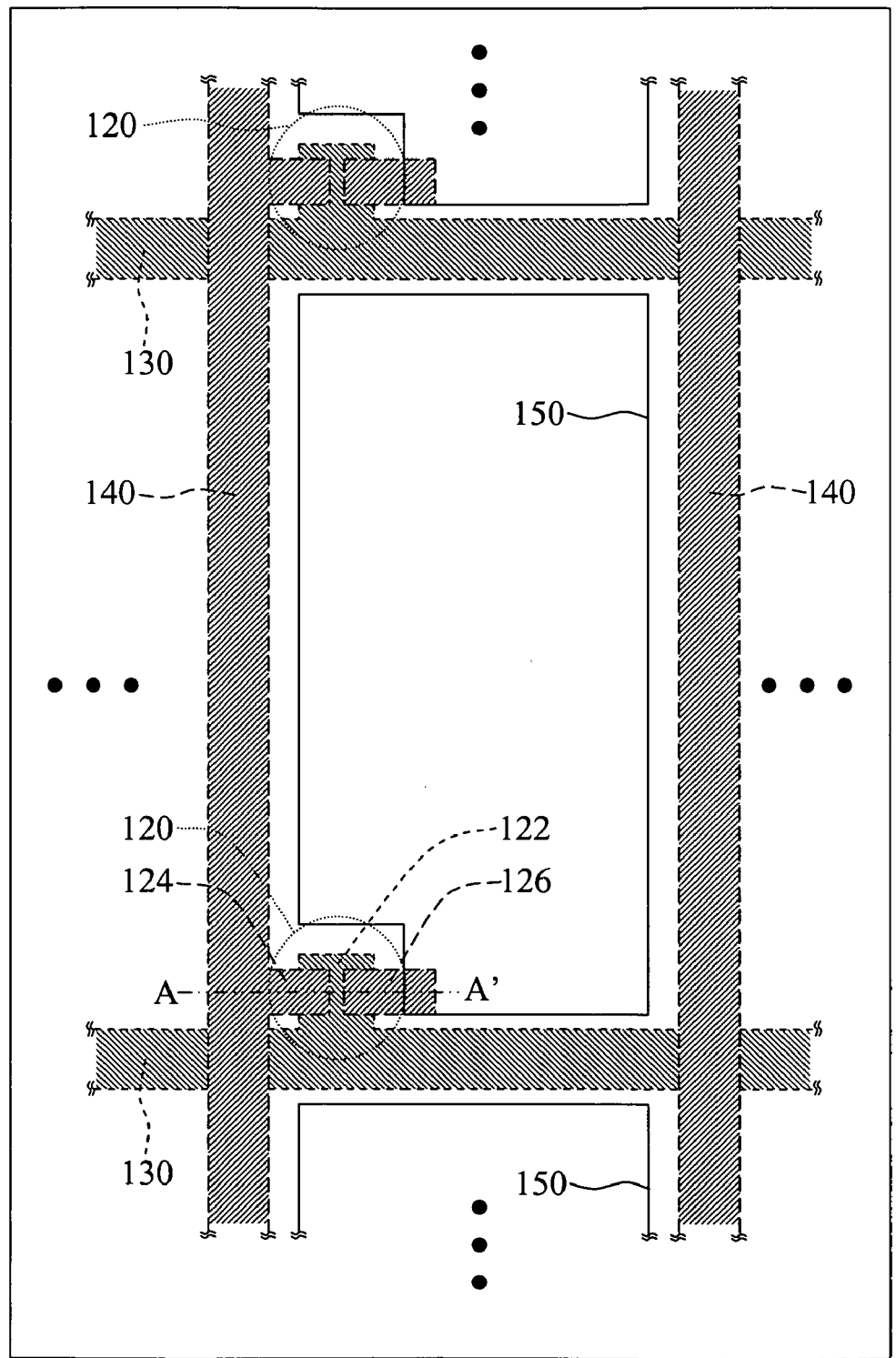
FIG. 1 is a partial top view of a conventional pixel array substrate.
Figure 2A:
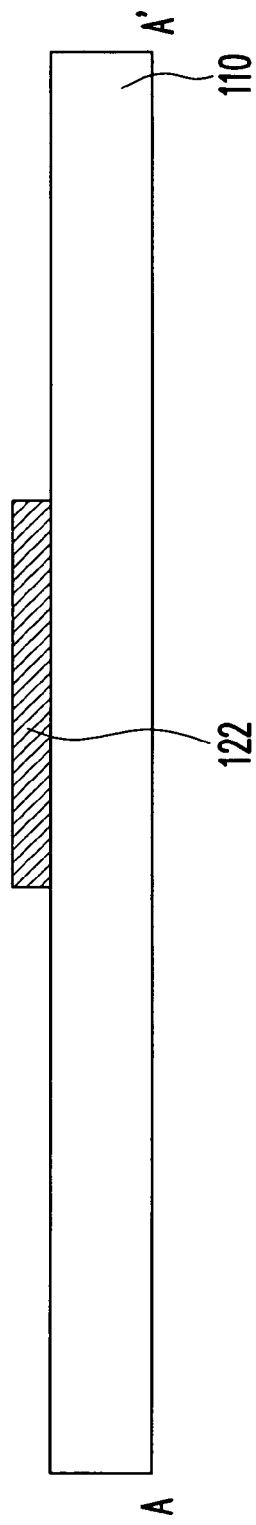
FIGS. 2A to 2E are cross-sectional views (along line A-A' shown in FIG. 1) illustrating a step flow for fabricating a pixel array substrate shown in FIG. 1.
Figure 2B:
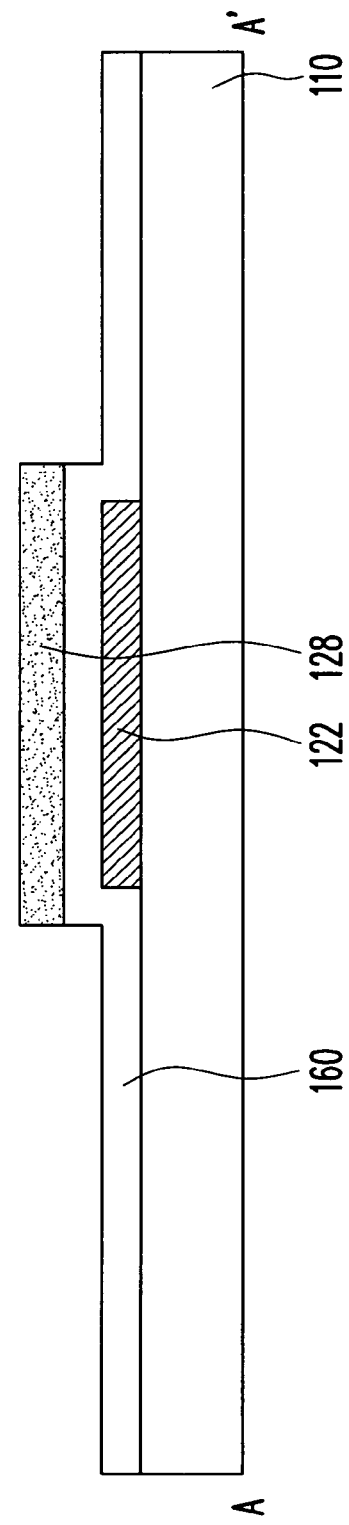
Figure 2C:
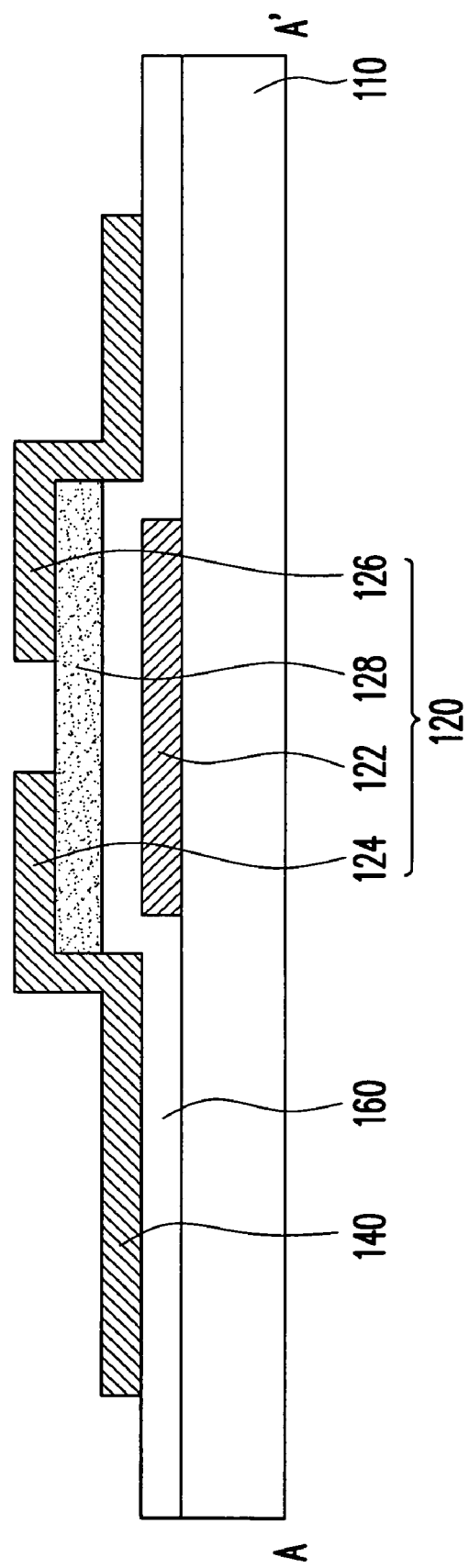
Figure 2D:
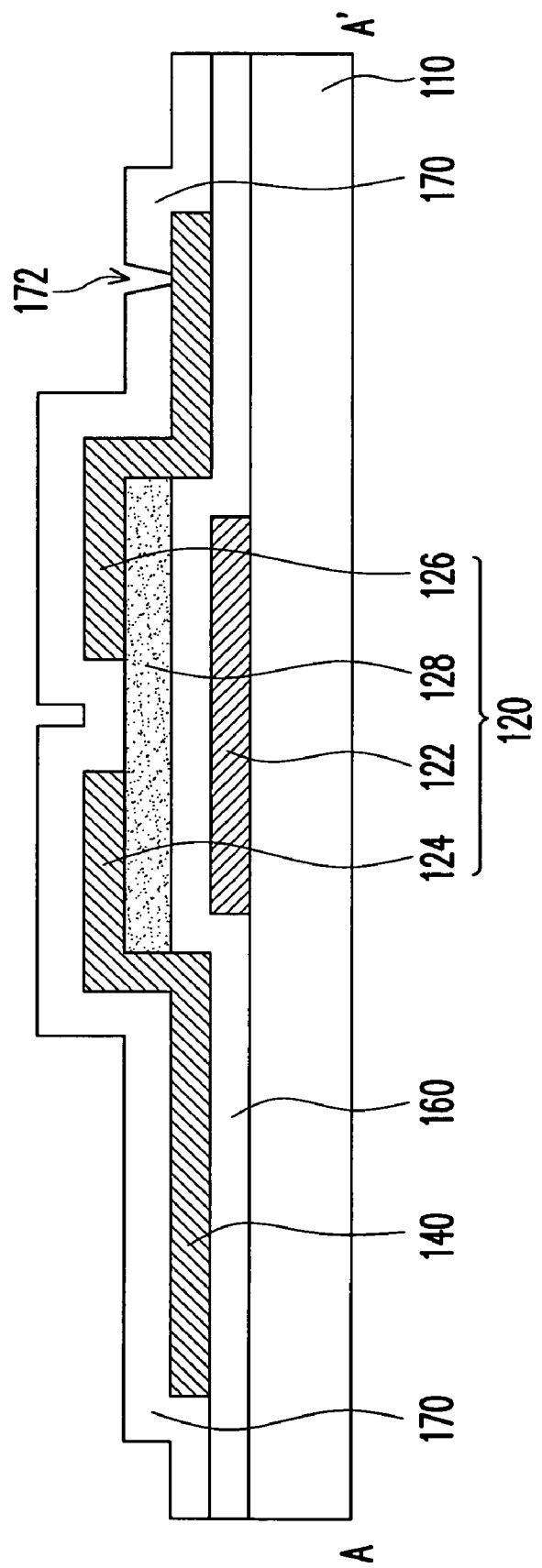
Figure 2E:
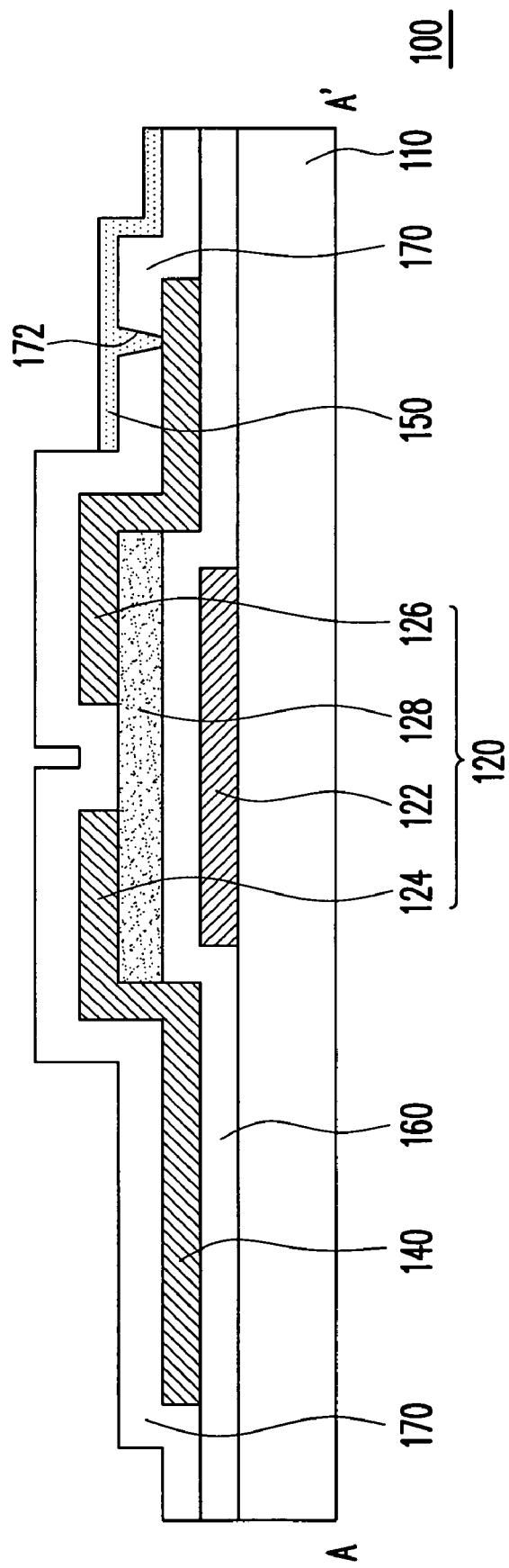
Figure 3:
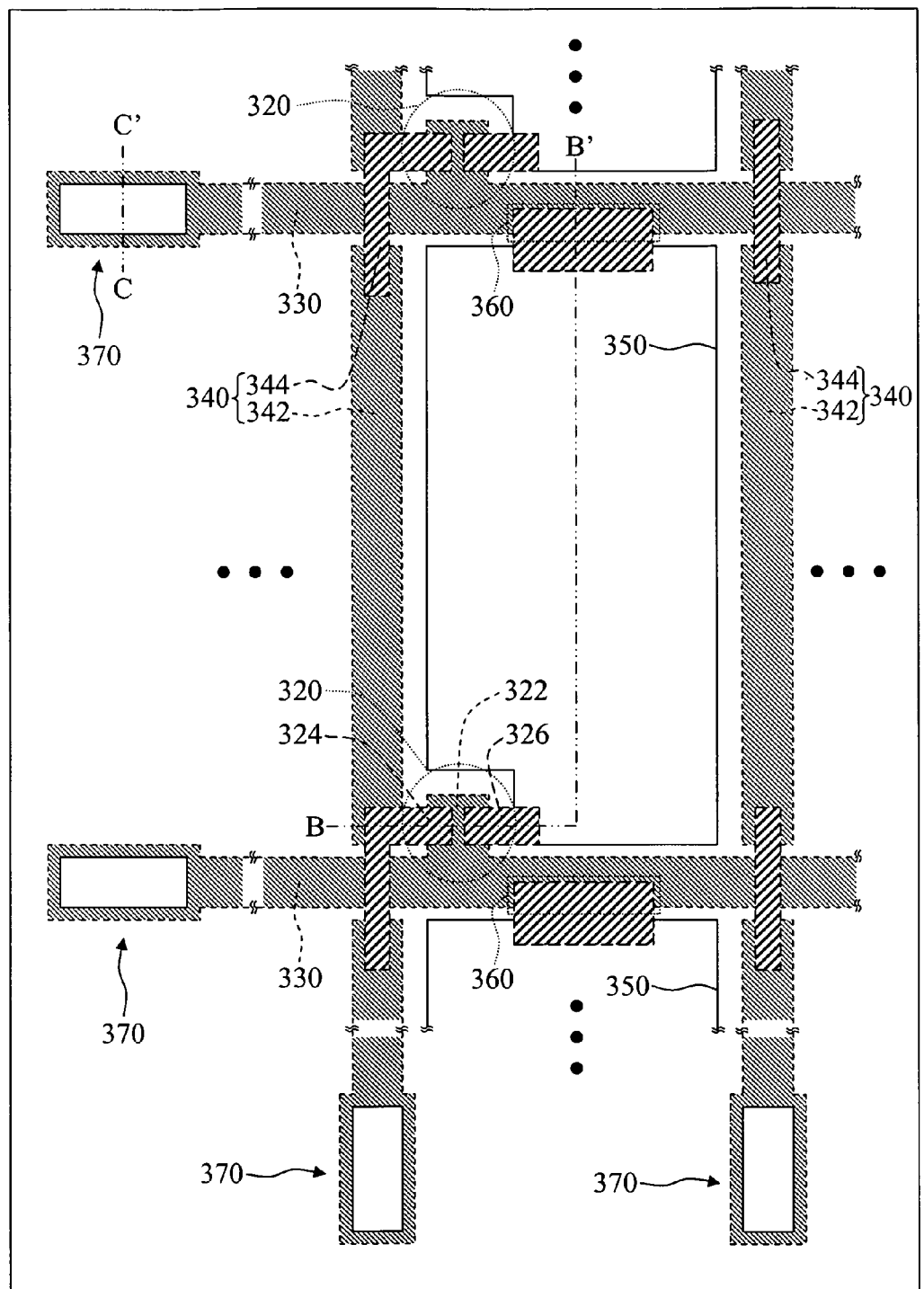
FIG. 3 is a partial top view of a pixel array substrate according to an embodiment of the present invention.

FIG. 3 is a partial top view of a pixel array substrate according to an embodiment of the present invention, while FIGS. 4A to 4F are respective cross-sectional views along lines B-B' and C-C' shown in FIG. 3 for illustrating a step flow for fabricating a pixel array substrate of FIG. 3. As shown in FIG. 3, a pixel array substrate 300 according to the present invention includes a substrate 310, a plurality of active devices 320, a plurality of scan lines 330, a plurality of data lines 340, and a plurality of pixel electrodes 350. The active devices 320 are disposed on the substrate 310 and each of the active devices 320 is electrically connected with a corresponding scan line 330, a corresponding data line 340 and a corresponding pixel electrode 350. Each of the data line 340 includes a plurality of data line patterns and a plurality of contacting portions 344. The contacting portions 344 are electrically connected with the data lines 342, and each of the contacting portions 344 crosses a scan line 330 without electrically connecting therewith.

In detail, the data lines 340 are composed of the data line patterns 342. The data line patterns 342 are simultaneously made of a same material with the scan lines 330. In order to avoid being short between the scan lines 330 and the data lines 340 at the intersections thereof, the contacting portions 344 cross over the scan lines 330 and electrically connect the adjacent data line patterns 342. Because the data line patterns 342 and the scan lines 330 have similar electrical properties, the data lines 340 and the scan lines 330 have approximate sheet resistance, whereby the data signal delay can be reduced.

According to an embodiment of the invention, the active device 320 is a TFT having a gate electrode 322, a source electrode 324 and a drain electrode 326. The source electrode 324 is electrically connected to a corresponding data line 340, and the drain electrode 326 is electrically connected to a corresponding pixel electrode 350. According to an embodiment, the pixel array substrate 300 also includes a plurality of capacitors 360 and a plurality of pads 370 disposed on the substrate 310. The capacitors are adapted for maintaining a stable voltage on the pixel electrodes 350, and each of the pads 370 is connected at an end of a scan line 330 or a data line 340.

A method for fabricating a pixel array substrate 300 according to an embodiment of the present invention is hereunder shown. Referring to FIG. 4A, a transparent conductive layer 510 and a first conductive layer 520 are formed on a substrate 310. The transparent conductive layer 510 is made of Indium Tin Oxide (ITO) or Indium Zinc Oxide (IZO), and the first conductive layer 520 is made of a material selected from one of the group consisting of Al, Mo, MoN, Ti, TiN, Cr, CrN, and combinations thereof. In this embodiment, the first conductive layer 520 is preferred to have a structure of a four-layered TiN/Al/Ti/TiN stack. Preferably, the Al layer has a thickness in the range from about 500 Å to about 2000 Å, and the Ti layer and the TiN layer have a thickness in the range from about 300 Å to about 1000 Å.

Figure 4E:
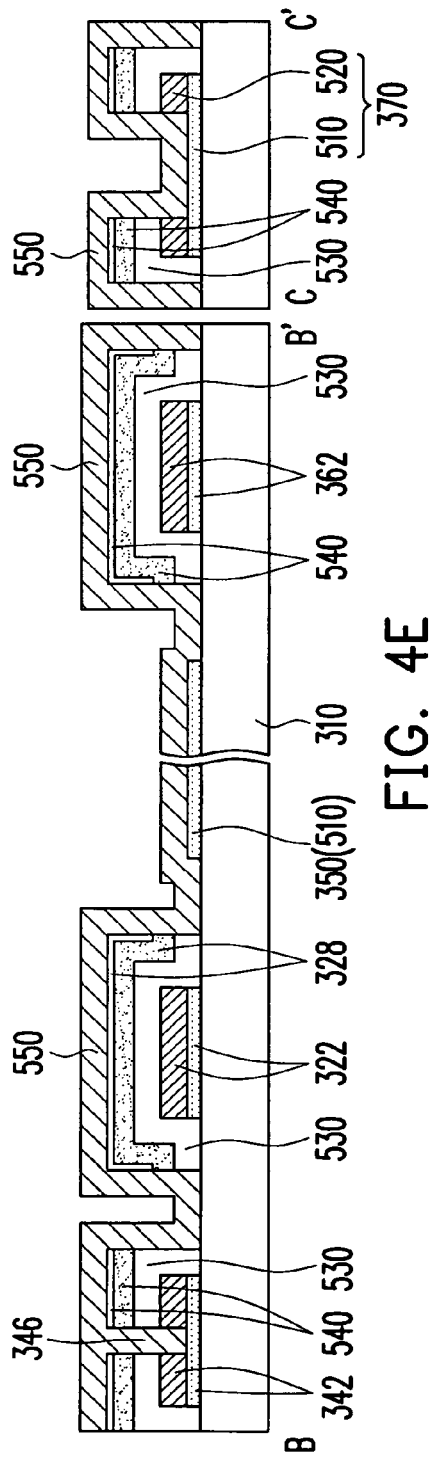
Figure 5A:
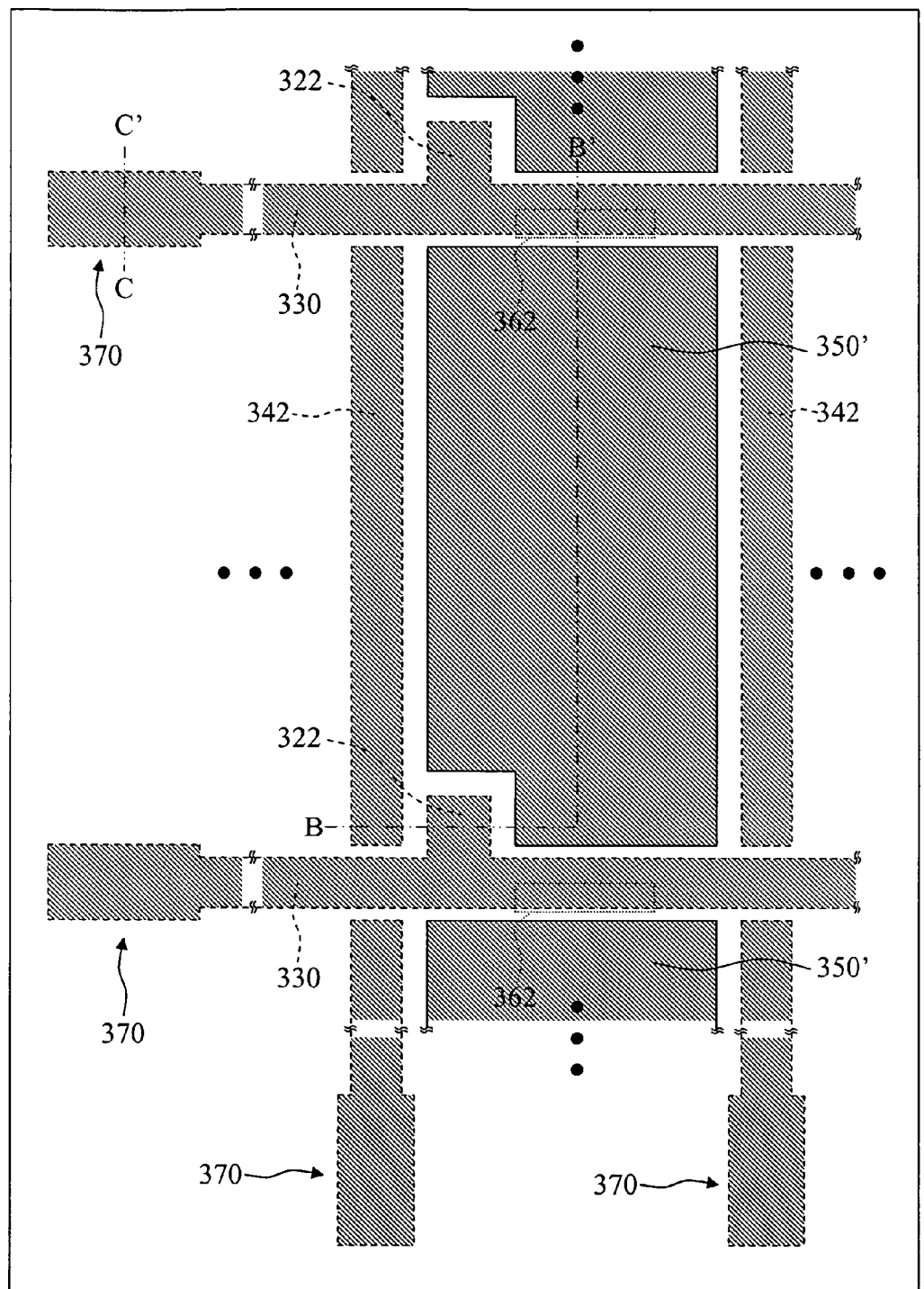
FIGS. 5A and 5B are top views respectively showing the result from the steps of FIGS. 4B and 4D.

For better illustration, a top view of the result from the process shown in FIG. 4B is illustrated in FIG 5A. Referring to FIGS. 4B and 5A, a first optical mask process is conducted to pattern the transparent conductive layer 510 and the first conductive layer 520 so as to form a plurality of gate electrodes 322, a plurality of scan lines 330, a plurality of data line patterns 342 and a plurality of pixel electrode patterns 350', each of the gate electrodes 322 being electrically connected with a corresponding scan line 330.

According to the embodiment of the present invention, the first optical mask process includes the steps of: forming a photo-resistant layer (not shown), then conducting an exposure and development process on the photo-resistant layer with an optical mask to form a patterned photo-resistant layer (not shown); then etching the transparent conductive layer 510 and the first conductive layer 520 by using the patterned photo-resistant layer as a mask to define the foregoing gate electrodes 322, scan lines 330, data line patterns 342 and pixel electrode patterns 350'; and finally, removing the patterned photo-resistant layer. Details of the optical mask process should be well understood by those skilled in the art and will not be iterated below.

According to an embodiment of the present invention, the step of conducting the first optical mask process further includes forming a plurality of pads 370 and a plurality of lower electrodes 362 which are critical for composing the capacitors 360. Each of the lower electrodes 362 is electrically connected to a corresponding scan line 330. According to another embodiment, in order to improve an aperture ratio of the pixel array substrate 300, there is no certain area provided for containing the lower electrodes 362, while a part of the scan lines 330 contributes to function as the lower electrodes 362.

Referring to FIG. 4C, a dielectric layer 530 and a semiconductor layer 540 are then formed over the substrate 310 in turn. The dielectric layer 530, for example, is made of an insulating material selected from $SiN_X$, $SiO_X$, or $SiO_XN_Y$. According to an embodiment, in order to improve the electric properties of the semiconductor layer 540, the semiconductor layer 540 further includes the channel material layer 542 and an ohmic contact layer 544. The channel material layer 542, for example, is made of amorphous silicon, α-Si, and the ohmic contact layer 544, for example, is made of n+ doped amorphous silicon, n+α-Si.

Figure 5B:
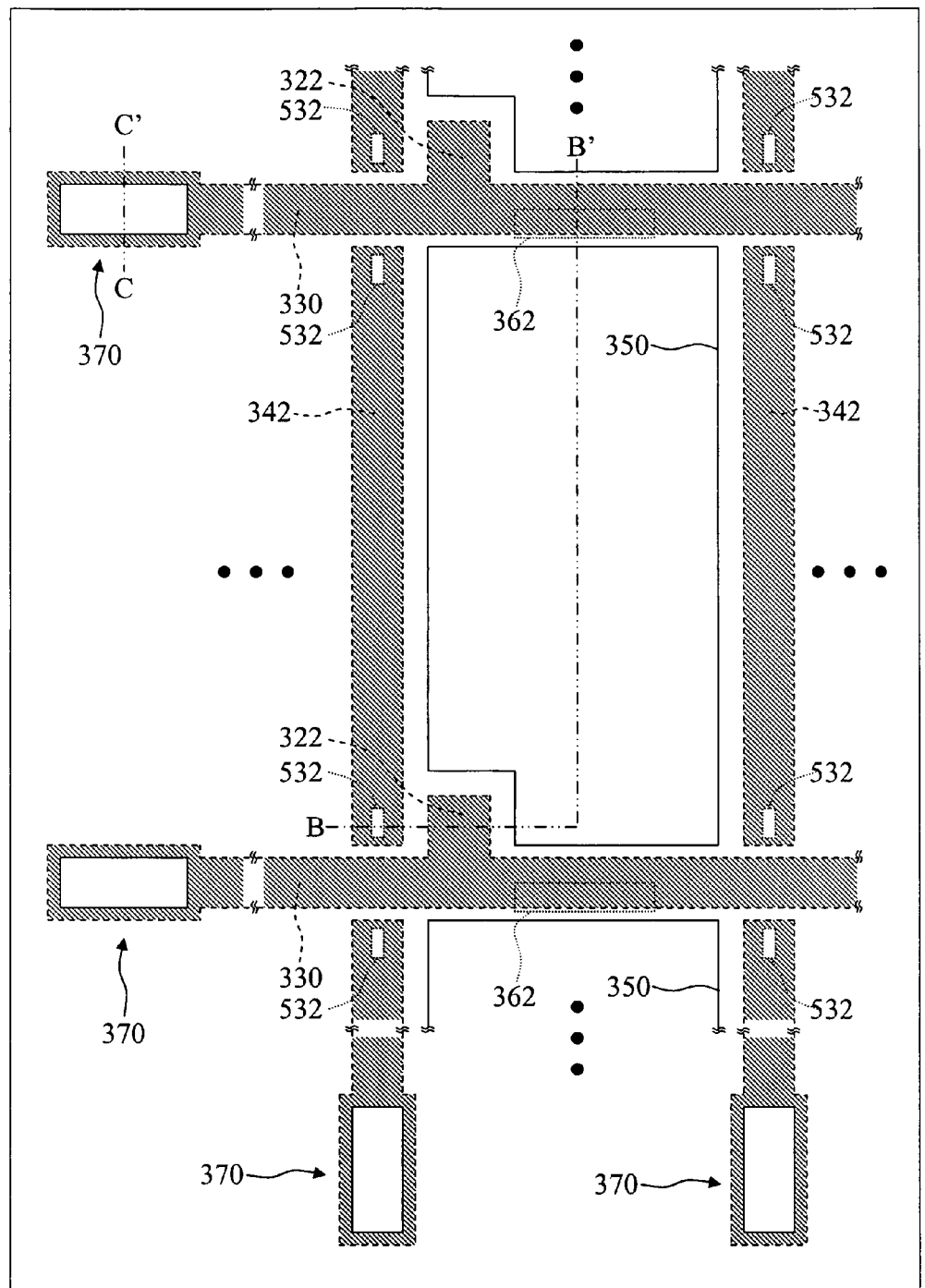

For better illustration, a top view of the result from the process shown in FIG. 4D is illustrated in FIG. 5B. Referring to FIGS. 4D and 5B, a second optical mask process is conducted to pattern the dielectric layer 530 and the semiconductor layer 540 to form a channel 328 over each of the gate electrodes 322. Herein, the first conductive layer 520 of the pixel electrode patterns 350' is simultaneously removed to expose the transparent conductive layer 510 of the pixel electrode patterns 350', thus configuring a plurality of pixel electrodes 350. It is to be noted that according to the present invention, a plurality of contact window openings 532 are also formed in the dielectric layer and the semiconductor layer 540 for exposing the data line patterns 342, and the contact window openings 532 are configured approximate to two ends of the data line patterns 342. Therefore, data line patterns 342 at the same column can be electrically connected with each other by a subsequent process to configure as a data line 340.

Further, according to an embodiment of the present invention, in the foregoing step of conducting the second optical mask process, a part of the dielectric layer 530 and the semiconductor layer 540 over the pads 370 are remained, while a part of the first conducive layer 520 of the pads is removed for exposing a part of the transparent conductive layer 510 of the pads 370. In addition, the dielectric layer 530 and the semiconductor layer 540 over the lower electrode 362 are remained.

Then referring to FIG. 4E, a second conductive layer 550 is formed over the substrate 310, and the second conductive layer 550 is filled into the contact window openings 532 to form a plurality of contact windows 346 electrically connecting with the data line patterns 342. The second conductive layer 550 is made of a material selected from Al, Mo, MoN, Ti, TiN, Cr, CrN, or combinations thereof. In this embodiment, the second conductive layer 550 is preferred to have a structure of a triple-layered Ti/Al/TiN stack. Preferably, the Al layer has a thickness in the range from about 500 Å to about 2000 Å, and the Ti layer and the TiN layer have a thickness in the range from about 300 Å to about 1000 Å. Furthermore, the first conductive layer 520 has a thickness greater than a thickness of the second conductive layer 550.

Figure 4F:
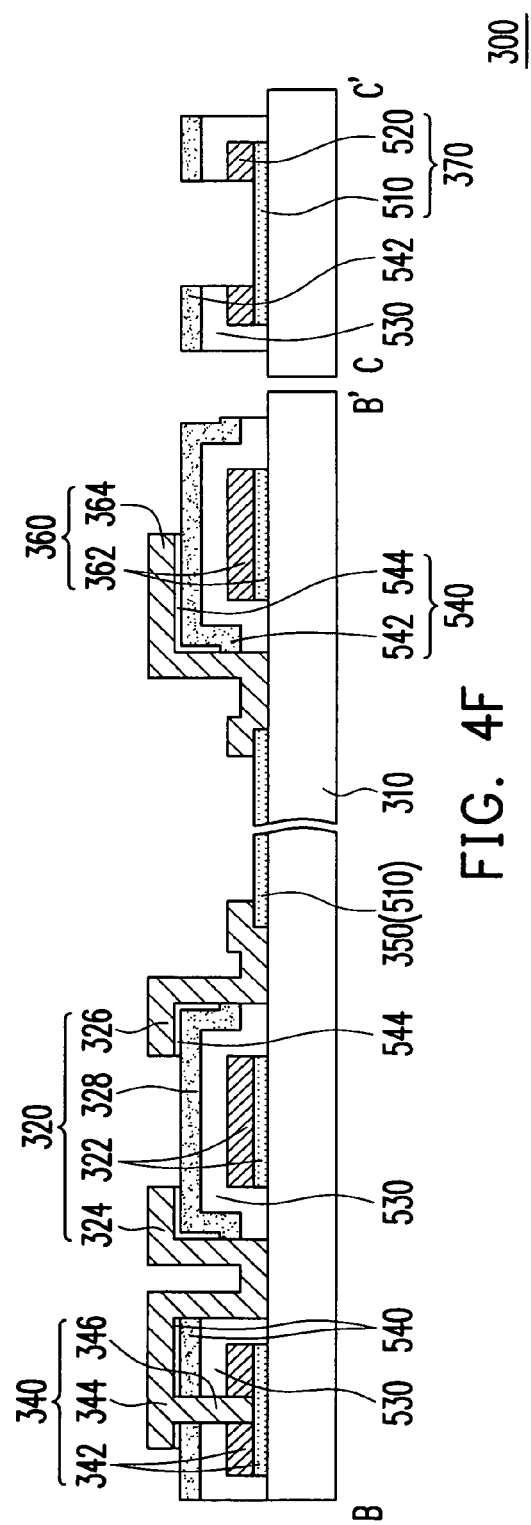

FIG. 3 is a partial top view of a pixel array substrate resulted from a process shown in FIG. 4F. Referring to FIGS. 4F and 3, a third optical mask process is conducted to pattern the second conductive layer 550 so as to form a plurality of contacting portions 344 which are electrically connected with the contact windows 346. Thus, the data line patterns 342 at the same column are electrically connected with each other by corresponding contacting portions 344 so as to constitute a data line 340. The data lines 340 are substantially composed of the data line patterns 342 and both the data line patterns 342 and the scan lines 330 are derived from the first conductive layer 520. Thus, they are made of the same material and have equivalent electrical properties. The data lines 340 and the scan lines 330 have approximate sheet resistance, whereby the data signal delay can be diminished.

Further, according to an aspect of the embodiment, in the foregoing step of conducting the third optical mask process, source electrodes 324 and drain electrodes 326 are simultaneously formed thereby. The drain electrode 326 is electrically connected to a corresponding pixel electrode 324 and the source electrode 324 is electrically connected to a corresponding data line 342. In other words, the source electrode 324 is electrically connected to the contacting portion 344, and then electrically connected to the data line patterns 342 via the contact windows 346. The gate electrode 322, the source electrode 324, the drain electrode 326 and the channel 328 constitute an active device 320. According to another embodiment, a part of thickness of the channel 328 is removed. That is, by removing a part of the ohmic contact layer 544 of the channel 328, a part of the channel material layer 542 of the channel 328 is exposed so that a short circuit between the source electrode 324 and the drain electrode 326 is avoided.

Note that after the steps illustrated above, the fabrication of the pixel array substrate 300 is completed. The method according to the present invention employs only three optical masks for three steps optical mask process, thus, the cost of fabricating pixel array substrate 300 is reduced.

Moreover, in the foregoing step of the embodiment, a plurality of upper electrodes 364 can be formed on the semiconductor layer 540, correspondingly over a part of the lower electrodes 362, and electrically connected with corresponding pixel electrodes 350. As such, a lower electrode 362 and a corresponding upper electrode 364 form a capacitor 360 for maintaining the voltage applied on the pixel electrode 350 stable. Also, it is to be noted that a part of second conductive layer 510 over the pads 370 can be removed according to the embodiment of the invention. As preferred in this embodiment, the second conductive layer 510 over the pads 370 is entirely removed in this step.

Figure 4G:
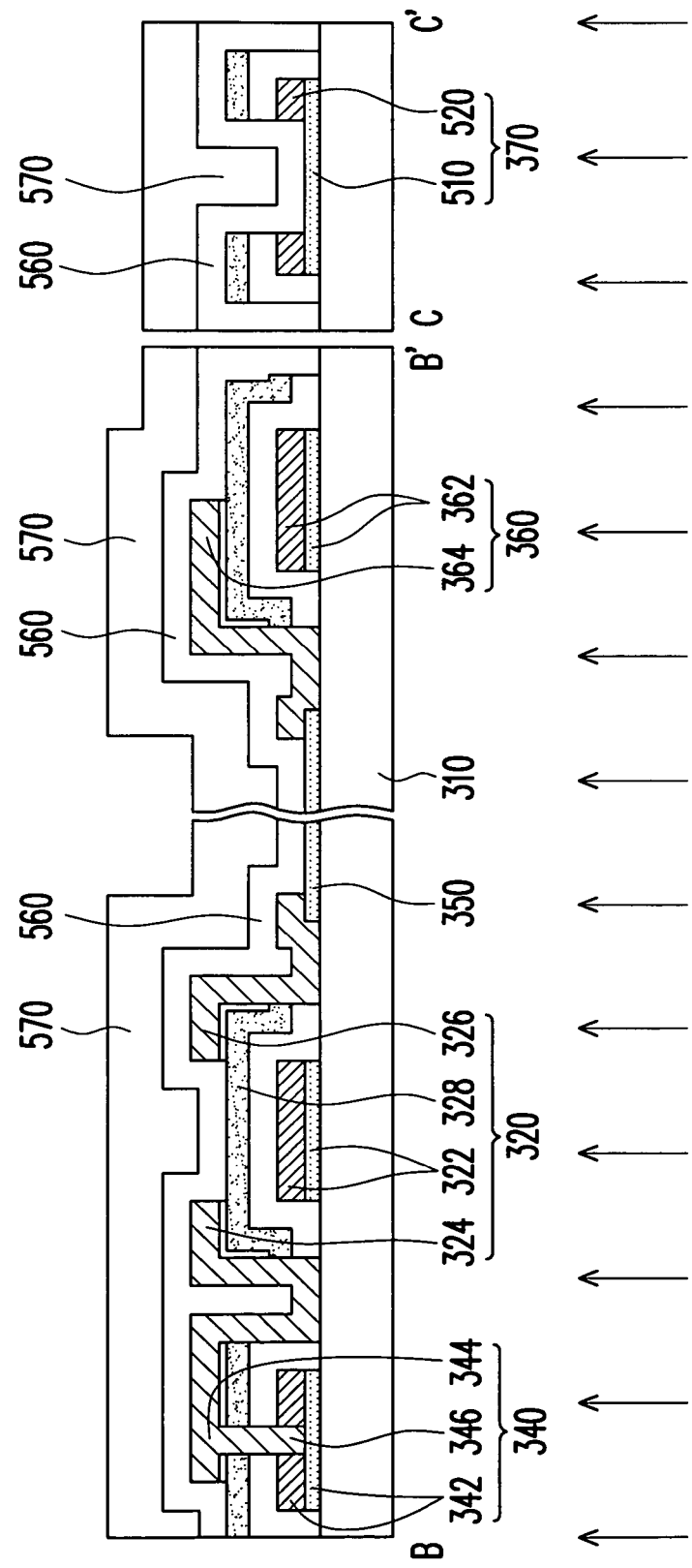
FIGS. 4G to 4J are cross-sectional views illustrating a step flow for forming a protecting layer on the pixel array substrate according to an embodiment of the present invention.

Furthermore, in order to improve the features of the pixel array substrate 300, according to an embodiment of the invention, the method further includes forming a protecting layer 560 for protecting the elements thereunder from being damaged by environmental factors. FIGS. 4G to 4J are cross-sectional views illustrating a step flow for forming a protecting layer on the pixel array substrate according to an embodiment of the present invention. FIG. 4G illustrates the sequential flow after FIG. 4F. Referring to FIG. 4G, a protecting layer 560 and a photo-resistant layer 570 are formed on the substrate 310. The protecting layer 560 is configured for insulating the elements thereunder from the environment, and, for example, is made of a material selected from $Si_xN_y$, $SiO_2$ or $SiN_xO_y$, and the photo-resistant layer 570, for example, is a positive photo-resistant. Then, the gate electrodes 322, the source electrodes 324, the drain electrodes 326, the scan line (not shown in the drawing), the data lines 340 and any other light-sheltering elements, e.g., the capacitors 360, are used as a mask for conducting a backside exposure process to the photo-resistant layer 570.

Figure 4H:
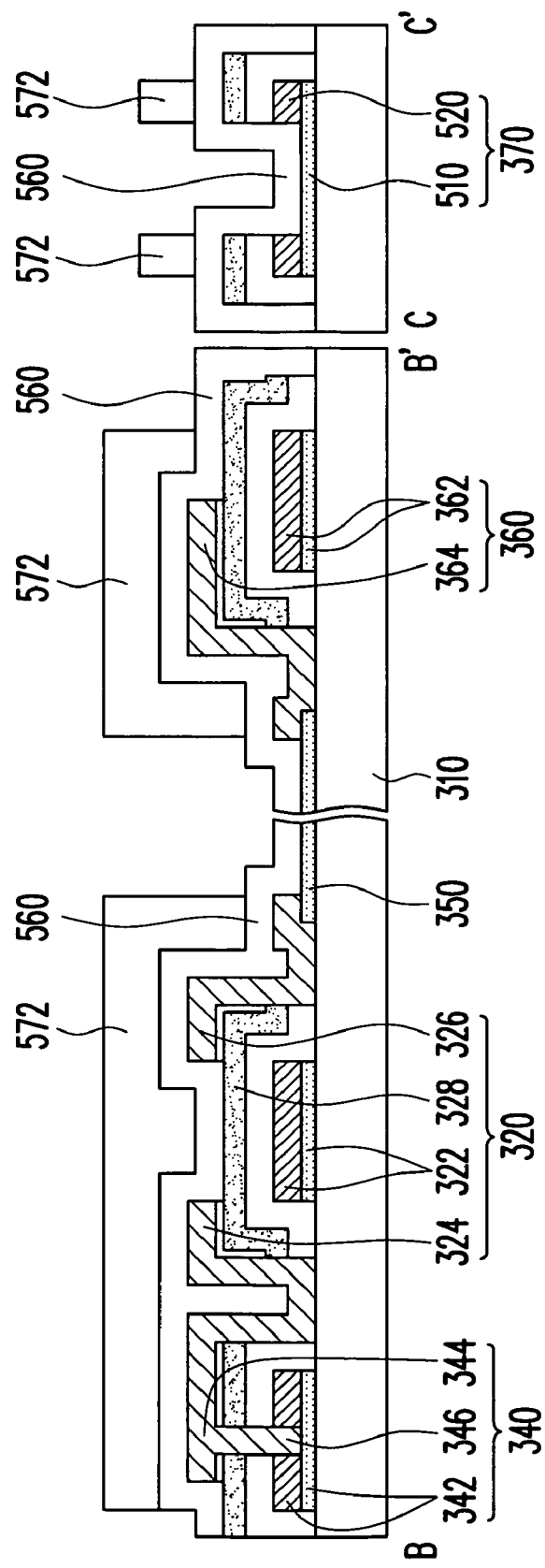

As shown in FIG. 4H, a later development process is conducted to the photo-resistant layer 570, in which an unexposed part of the photo-resistant layer 570 that would not have been developed forms a patterned photo-resistant layer 572. As disclosed above, the pixel electrodes 350 are derived from the transparent conductive layer 510, thus the part of photo-resistant layer 570 positioned over the pixel electrodes 350 is removed by the exposure process to expose the protecting layer 560. Likewise, a part of the protecting layer over a part of the pads 370 is also exposed because of lack of light-sheltering elements disposed thereover.

Figure 4I:
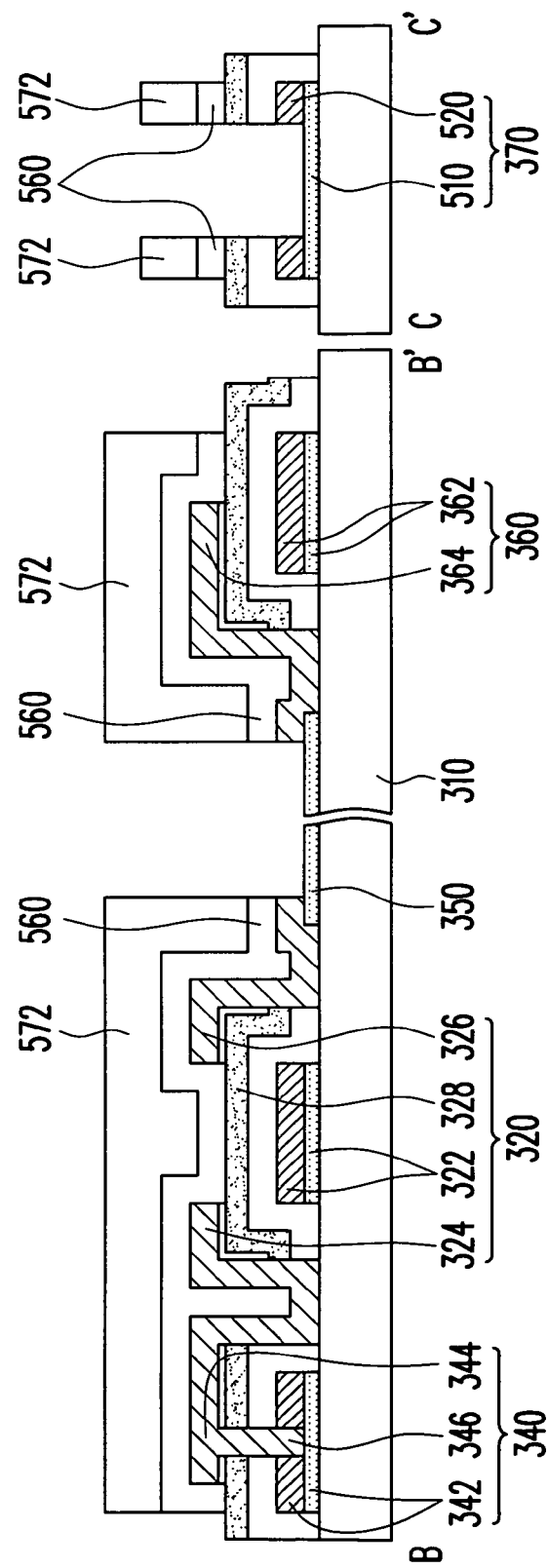
Figure 4J:
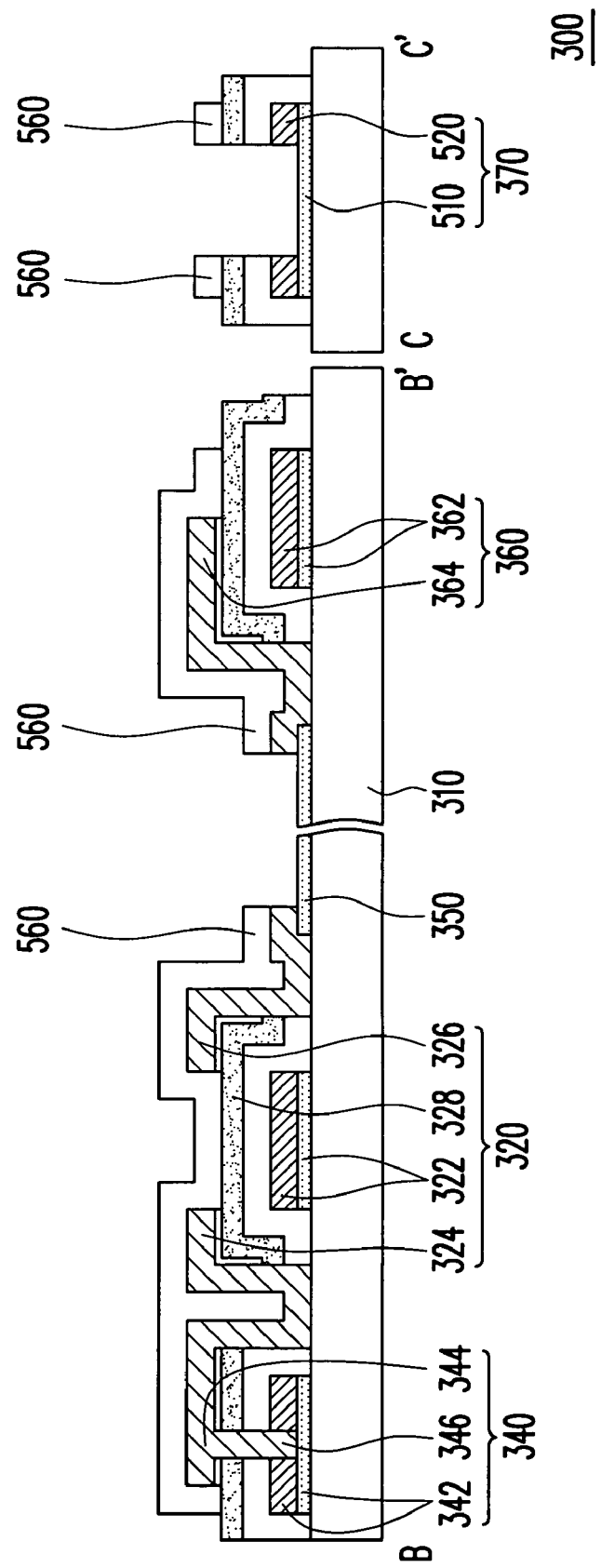

Referring to FIG. 4I, etching the protecting layer 560 by using the patterned photo-resistant layer 572 as a mask to expose the pixel electrodes 350 and a part of the pads 370. Then referring to FIG. 4J, a stripper process is conducted to remove the patterned photo-resistant layer 572, by which the pixel array substrate 300 having a protecting layer 560 is finally achieved. It is to be noted that the foregoing backside exposure process is conducted by taking those light-sheltering elements of the pixel array substrate 300 as an optical mask, thus extra optical masks are not needed. Therefore, the cost for fabricating such a pixel array substrate 300 can be reduced accordingly.

As illustrated above, according to the embodiments of the present pixel array substrate 300, the data lines 340 are configured by electrically connected a plurality of data line patterns, and the data lines 340 have sheet resistance approximate to that of the scan lines 330, by which the data signal delay can be diminished. However, the present invention is not intended to be limited in such a manner. For example, according to a principal of the present invention, instead of employing data lines each composed of a plurality of data line patterns, the pixel array substrate 300 can also employ similar structure that have scan lines composed of a plurality of scan line patterns electrically connected to each other.

Figure 6:
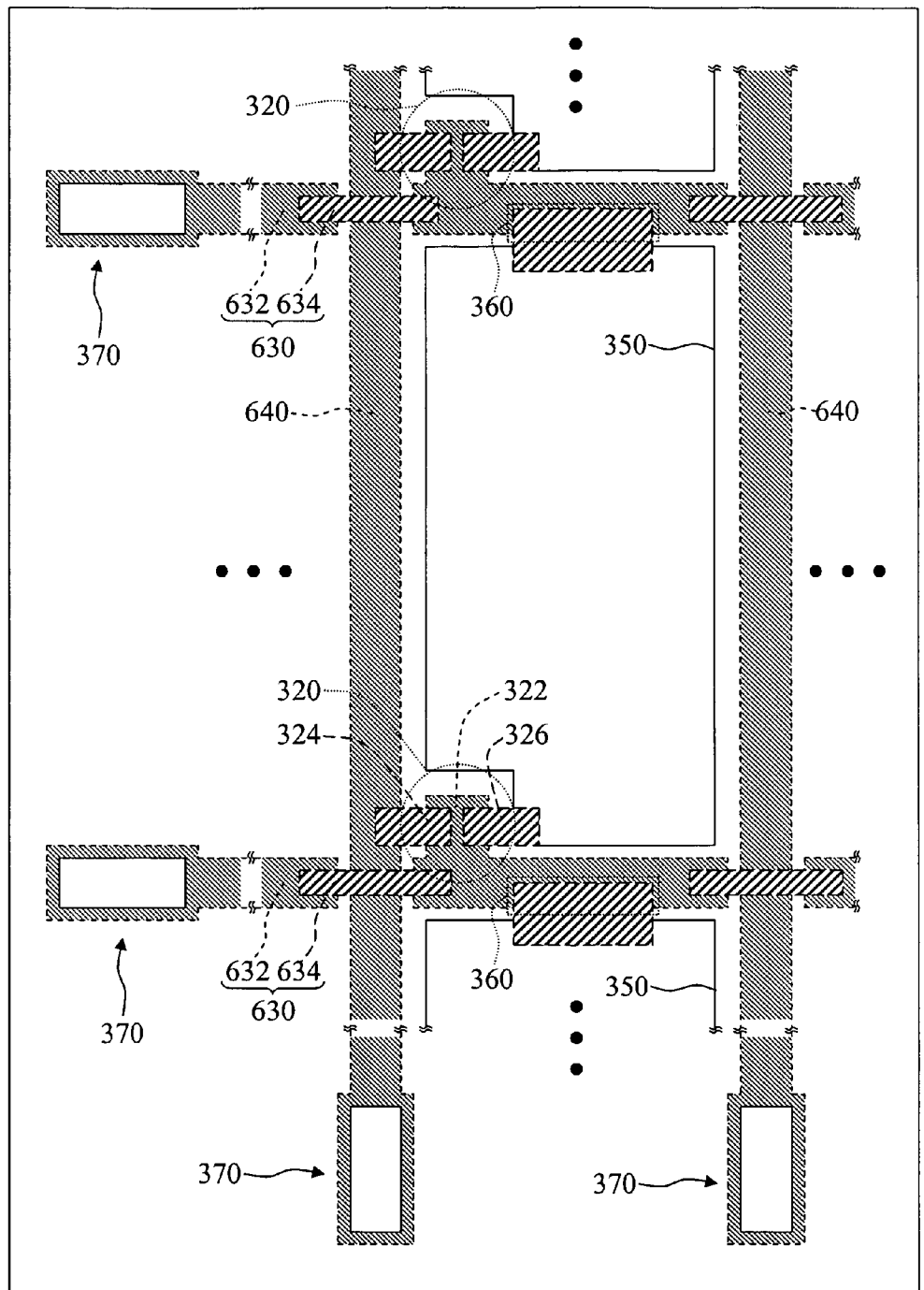
FIG. 6 is a partial top view of a pixel array substrate according to another embodiment of the present invention.

FIG. 6 is a partial top view of a pixel array substrate 600 according to another embodiment of the present invention. Referring to FIG. 6, the pixel array substrate 600 is similar to the pixel array substrate 300 disclosed above, except that it has a plurality of scan lines 630, each including a plurality of scan line patterns 632 and a plurality of contacting portions 634. The contacting portions 634 are electrically connected with the scan line patterns 632, and each of the contacting portions 634 crosses over one of the data lines 640 without being electrically connected therewith.

Also, the method for fabricating such a pixel array substrate 600 is similar with that of the pixel array substrate 300. The difference will be illustrated here below. When conducting the first optical mask process, according to the present embodiment, a plurality of scan line patterns 632 and a plurality of data lines 640 are formed. When conducting the second optical mask process, according to the present embodiment, a plurality of contact window openings (not shown) is formed over a part of the scan line patterns 632, and a contact window is formed subsequently in each of the contact window openings for electrically connecting the scan line patterns 632. When conducting the third optical mask process, according to the present embodiment, a plurality of contacting portions 634 is configured to be electrically connected with the contact windows. In such a way, the scan line patterns 632 at the same row are electrically connected with each other by corresponding contacting portions 634 and the contact windows so as to constitute a scan line 630. It is believed that those of ordinary skill in the art should be able to understand and apply the present invention according to what is disclosed above without more detailed illustration with drawings.

It should also be known that the principal of the present invention should not be limited or defined as employing data lines or scan lines that are composed of sectioned units thereof. Any different types of lines, e.g., common lines, power lines, repair lines can be adapted in such a manner according to the principal of the present invention, providing such lines need to be alternately configured and require approximate electrical properties. What is needed addressing thereto is only dividing a type of lines into a plurality of line patterns, and electrically connecting the line patterns together later. The details should have been clear and well understood to those of ordinary skill in the art in accordance with the above disclosure.

In summary, the method for fabricating a pixel array substrate according to the present invention has at least the following advantages:

1. The present invention only requires three optical masks for fabricating the pixel array substrate, while the conventional technology requires five, thus reducing fabrication cost addressing thereto;
2. The method of the present invention is compatible with the currently existing process, thus requiring no extra equipment thereof; and
3. Because the data lines are mainly composed of the data line patterns and the data line patterns the scan lines are simultaneously formed with the same material, they have similar electrical properties, and thus the data lines and the scan lines have approximate sheet resistance, by which the data signal delay can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for fabricating a pixel array substrate, comprising:
    forming a transparent conductive layer and a first conductive layer in sequence on a substrate,
    conducting a first optical mask process to pattern the first conductive layer and the transparent conductive layer so as to form a plurality of gate electrodes, a plurality of scan lines electrically connected with the gate electrodes, a plurality of data line patterns and a plurality of pixel electrode patterns;
    forming a dielectric layer and a semiconductor layer over the substrate in sequence;
    conducting a second optical mask process to pattern the dielectric layer and the semiconductor layer so as to form a channel over each of the gate electrodes and a plurality of contact window openings exposing the data line patterns, and removing the first conductive layer of the pixel electrode patterns so as to form a plurality of pixel electrodes;
    forming a second conductive layer over the substrate, wherein the second conductive layer fills into the contact window openings so as to form a plurality of contact windows electrically connected with the data line patterns; and
    conducting a third optical mask process to pattern the second conductive layer to form a plurality of contacting portions which are electrically connected with the contact windows, a plurality of source electrodes which are electrically connected with the data line patterns, and a plurality of drain electrodes which are electrically connected with the pixel electrodes, and removing the second conductive layer on each of the pixel electrodes,
    wherein the data line patterns at each column are electrically connecting with each other via the contacting portions and the contact windows so as to form a data line.

2. The method according to claim 1, after conducting the third optical mask process, further comprising:
    forming a protecting layer and a photo-resistant layer in sequence over the substrate;
    conducting a backside exposure process by using the gate electrodes, the source electrodes, the drain electrodes, the scan lines and the data lines as a mask, and then performing a development process to form a patterned photo-resistant layer;
    etching the protecting layer by using the patterned photo-resistant layer as a mask to expose the pixel electrodes; and
    removing the patterned photo-resistant layer.

3. The method according to claim 1, wherein:
    the first optical mask process further comprises forming a plurality of pads, each pad being electrically connected to an end of a corresponding scan line or data line;
    the second optical mask process further comprises remaining a part of the dielectric layer and a part of the semiconductor layer over the pads, and removing a part of the first conducive layer of the pads; and
    the third optical mask process further comprises removing a part of the second conductive layer over the pads.

4. The method according to claim 1, wherein:
    the first optical mask process further comprises forming a plurality of lower electrodes;
    the second optical mask process further comprises remaining the dielectric layer and the semiconductor layer correspondingly positioned over the lower electrodes; and
    the third optical mask process further comprises forming a plurality of upper electrodes on the semiconductor layer over a part of the lower electrodes,
    wherein the lower electrodes and the upper electrodes constitute a plurality of capacitors, in which each lower electrode is electrically connected with a corresponding scan line and each upper electrode is electrically connected with a corresponding pixel electrode.

5. The method according to claim 1, wherein the third optical mask process further comprises removing a part of thickness of the channels.

6. The method according to claim 1, wherein the semiconductor layer comprises a channel material layer and an ohmic contacting material layer.

7. The method according to claim 1, wherein the first conductive layer has a thickness greater than a thickness of the second conductive layer.

8. A method for fabricating a pixel array substrate, comprising:
    forming a transparent conductive layer and a first conductive layer in sequence on a substrate,
    conducting a first optical mask process to pattern the first conductive layer and the transparent conductive layer so as to form a plurality of gate electrodes, a plurality of scan line patterns electrically connected with the gate electrodes, a plurality of data lines and a plurality of pixel electrode patterns;
    forming a dielectric layer and a semiconductor layer over the substrate in sequence;
    conducting a second optical mask process to pattern the dielectric layer and the semiconductor layer to form a channel over each of the gate electrodes and a plurality of contact window openings for exposing the scan line patterns, and removing the first conductive layer of the pixel electrode patterns so as to form a plurality of pixel electrodes;
    forming a second conductive layer over the substrate, wherein the second conductive layer fills into the contact window openings so as to form a plurality of contact windows electrically connected with the scan line patterns; and conducting a third optical mask process to pattern the second conductive layer to form a plurality of contacting portions which are electrically connected with the contact windows, a plurality of source electrodes which are electrically connected with the data lines, and a plurality of drain electrodes which are electrically connected with the pixel electrodes, and removing the second conductive layer on each of the pixel electrodes, wherein the scan line patterns at each row are electrically connecting with each other via the contacting portions and the contact windows so as to form a scan line.

9. The method according to claim 8, after the third optical mask process, further comprising:

forming a protecting layer and a photo-resistant layer in sequence over the substrate;

conducting a backside exposure process by using the gate electrodes, the source electrodes, the drains, the scan lines and the data lines as a mask and then performing a development process to form a patterned photo-resistant layer;

etching the protecting layer by using the patterned photo-resistant layer as a mask to expose the pixel electrodes; and removing the patterned photo-resistant layer.

10. The method according to claim 8, wherein:

the first optical mask process further comprises forming a plurality of pads, each pad being electrically connected to an end of a corresponding scan line or data line;

the second optical mask process further comprises remaining a part of the dielectric layer and a part of the semiconductor layer over the pads, and removing a part of the first conducive layer of the pads; and the third optical mask process further comprises removing a part of the second conductive layer over the pads.

11. The method according to claim 8, wherein:

the first optical mask process further comprises forming a plurality of lower electrodes;

the second optical mask process further comprises remaining the dielectric layer and the semiconductor layer correspondingly positioned over the lower electrodes; and the third optical mask process further comprises forming a plurality of upper electrodes on the semiconductor layer over a part of the lower electrodes, wherein the lower electrodes and the upper electrodes constitute a plurality of capacitors, in which each lower electrode is electrically connected with a corresponding scan line and each upper electrode is electrically connected with a corresponding pixel electrode.

12. The method according to claim 8, wherein the third optical mask process further comprises removing a part of thickness of the channels.

13. The method according to claim 8, wherein the semiconductor layer comprises a channel material layer and an ohmic contacting material layer.

14. The method according to claim 8, wherein the first conductive layer has a thickness greater than a thickness of the second conductive layer.

* * * * *